United States Patent Office 3,686,143
Patented Aug. 22, 1972

3,686,143
GUANIDINE AND AMIDINE ACCELERATORS FOR VULCANIZATION OF FLUOROELASTOMERS
John Michael Bowman, Newark, Del., assignor to E. I. du Pont de Nemours and Company, Wilmington, Del.
No Drawing. Continuation-in-part of application Ser. No. 32,720, Apr. 28, 1970, which is a continuation-in-part of abandoned application Ser. No. 815,497, Apr. 11, 1969. This application Mar. 22, 1971, Ser. No. 126,928
Int. Cl. C08f 27/08, 45/72
U.S. Cl. 260—47 UP
16 Claims

ABSTRACT OF THE DISCLOSURE

Highly fluorinated elastomer stocks are cured by heating with aromatic polyhydroxylic compounds in the presence of either a pentasubstituted guanidine or an N,N,N'-substituted amidine higher than formamidine. The guanidine and amidine substituents can be alkyl, cycloalkyl, or aralkyl radicals of 1–20 carbon atoms. Guanidine substituents also can be aryl radicals, provided that no more than two such groups are present. Instead of a pentasubstituted guanidine, its salts with either organic or inorganic acids can be used. The curable elastomer composition also contains a metal compound such as a divalent metal oxide or hydroxide, or a blend of the oxide or hydroxide with a metal salt of a weak acid.

CROSS-REFERENCE TO RELATED APPLICATIONS

This is a continuation-in-part of patent application Ser. No. 32,720 filed Apr. 28, 1970 (now abandoned); the latter was a continuation-in-part of application Ser. No. 815,497 filed Apr. 11, 1969 (now abandoned).

BACKGROUND OF THE INVENTION

This invention relates to a new curing process for elastomeric highly fluorinated polymers; and it concerns curable as well as cured fluoroelastomer compositions.

Highly fluorinated elastomers have found increasing application in specialized areas, such as high temperature-resistant gaskets, seals, diaphragms, and tubing. Fabricated fluoroelastomer articles can withstand temperatures of about 250–350° C. while retaining their good elasticity.

It is necessary for many applications, for example gaskets for high-temperature reactors, that the fluoroelastomer article be resilient and have low compression set. This is accomplished by curing the article; this comprises vulcanization or cross-linking of the elastomer.

Prior art processes for vulcanization of fluoroelastomers use mainly aliphatic diamines as cross-linking agents; they employ free radical-initiated vulcanization in the presence of organic peroxides or high energy radiation. The diamines generally are too scorchy for practical application, and more recently have been replaced by carbamates or aminocarbamic acids. Organic peroxides tend to provide fast gelation, and compounded stocks consequently do not have the required processing safely. High energy radiation is a slow process which does not always lead to a fully cured material. In addition, this process is quite expensive. There is a need, therefore, for a fluoroelastomer vulcanization process which combines satisfactory cure rates with good processing safety and good storage stability of unvulcanized formulations, and which yields vulcanized polymers of good stress/strain properties and a low compression set.

SUMMARY OF THE INVENTION

It has been found that elastomeric copolymers of two or more fluorinated monomers can be cross-linked with certain aromatic polyhydroxylic compounds in the presence of a certain metal compound such as a divalent metal oxide or hydroxide, or a mixture of the oxide or hydroxide with a metal salt of a weak acid, and in the presence of a vulcanization accelerator composed of (a) A pentasubstituted guanidine of Formula I

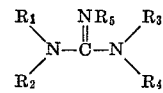

where each of $R_1$, $R_2$, $R_3$, $R_4$, and $R_5$ can independently be an alkyl, cycloalkyl, aralkyl, or aryl radical of 1–20 carbon atoms, but no more than two radicals are aryl radicals, and any two radicals can be joined together to form a ring structure; or its salt with an organic or an inorganic acid; or (b) An N,N,N'-trisubstituted amidine of Formula II

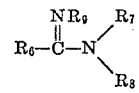

where each $R_6$, $R_7$, $R_8$, and $R_9$ can independently be an alkyl, cycloalkyl, or aralkyl radical of 1–20 carbon atoms, and any two such substituents can be joined together to form a ring structure.

DETAILED DESCRIPTION

Any highly fluorinated elastomer which can be cured by prior art methods to useful products can be used as the starting material in the process of this invention. Often such elastomers are dipolymers of vinylidene fluoride with perhalogenated monomers, such as hexafluoropropylene, chlorotrifluoroethylene, dichlorodifluoroethylene, and trichlorofluoroethylene or terpolymers of vinylidene fluoride with two fluorinated monomers, for example with hexafluoropropylene, and tetrafluoroethylene. For good elastic properties, such copolymers should have a random distribution of their monomer units. The preferred starting material is a vinylidene fluoride/hexafluoropropylene copolymer in which these two monomers are combined in a mole ratio of 85:15 to 50:50. Highly fluorinated copolymers are well known in the art and many are commercially available under such trade names as "Viton" (Du Pont), and "Fluorel" (Minnesota Mining and Manufacturing Co.).

The curable composition used in the present process contains a polyhydroxylic aromatic compound crosslinking agent which can be any one of the following: di-, tri-, and tetrahydroxybenzenes, naphthalenes, and anthracences, and bisphenols of the Formula III

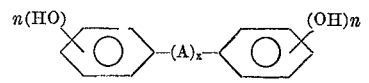

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine, or a carboxyl or acyl radical (e.g. a —COR where R is H or a $C_1$–$C_8$ alkyl, aryl, or cycloalkyl group). It will be understood from the above bisphenol formula that the —OH groups can be attached in any position (other than number one) in either ring. Blends of two or more such compounds can also be used. One of the most useful crosslinking agents is the bisphenol compound known as Bisphenol AF, which is hexafluoroisopropylidene-bis(4-hydroxybenzene). The compounds 4,4'-dihydroxydiphenyl sulfone (Bisphenol S) and isopropylidene-bis(4-hydroxybenzene) or Bisphenol A are also considered as very useful bisphenols. Another very useful cross-linking agent is hydroquinone. Others are illustrated by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; also included are such compounds as 1,5-dihydroxynaphthalene and 9,10-dihydroxyanthracene. Others are illustrated as follows:

1,4,9,10-tetrahydroxyanthracene;
2,2′,4,4′-tetrahydroxybenzophenone;
2,4-dihydroxybenzophenone;
2,4-dihydroxybenzoic acid;
4,4′-dihydroxytetraphenylmethane;
2,6-dihydroxyanthraquinone;
3,6-dihydroxyxanthone;
pyromellitic-bis-(p-hydroxyphenylimide);
2,4-dihydroxyacetophenone;
4,4′-dihydroxybenzophenone;
4,4′-dihydroxydiphenyl sulfoxide;
2,4-dibenzoylresorcinol;
2,4,5-trihydroxybutyrophenone;
2,4-dihydroxybenzaldehyde.

When changing from one cross-linking agent to another in a given composition, one skilled in the art will be able to select a curing time and temperature that will give a suitable rate of cure for a particular application.

Referring to the bisphenol formula shown above, when A is alkylene, it can be for example methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene, and hexamethylene. When A is alkylidene, it can be for example, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, and hexylidene. When A is a cycloalkylene radical, it can be for example 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4 - naphthylene, 3-fluoro-1,4-naphthylene, 5-chloro-1,4-naphthylene, 1,5-naphthylene, and 2,6-naphthylene.

Crosslinking of highly fluorinated polymers with aromatic polyhydroxylic compounds must be carried out in the presence of a catalyst. Catalysts which accelerate vulcanization or curing of elastomers are generally referred to as "vulcanization accelerators." According to this invention, suitable vulcanization accelerators are pentasubstituted guanidines of Formula I as well as their salts with both organic and inorganic acids and N,N,N′-trisubstituted amidines of Formula II above.

The organic substituents on both guanidine and amidine nitrogen atoms include alkyl radicals such as methyl, ethyl, propyl, isopropyl, butyl, isobutyl, pentyl, hexyl, decyl, dodecyl, hexadecyl, octadecyl, and eicosyl. The cycloalkyl substituents on both guanidine and amidine nitrogen atoms can be for example cyclopentyl, cyclohexyl, cycloheptyl and cyclooctyl radicals. The aralkyl substituents on both the guanidine and amidine nitrogen atoms include benzyl, phenethyl, methylbenzyl, phenylbutyl, naphthylmethyl and naphthylethyl. Aryl substituents also can be present on guanidine nitrogen atoms, provided that the number of such aryl substituents does not exceed two. When more than two aryl substituents are present, such guanidine derivatives are not always effective fluoroelastomer vulcanization accelerators. Representative aryl substituents include phenyl, naphthyl, anthryl, tolyl, xylyl and tetramethylphenyl radicals.

When pentasubstituted guanidines are the vulcanization accelerators, they can be used either as free bases or as their salts with organic or inorganic acids. Representative salts which can be used in the process of this invention include pentasubstituted guanidine sulfates, nitrates, phosphates, hydrochlorides, hydrobromides, acetates, propionates, butyrates, benzoates, phenates, formates, benzenesulfonates, and naphthalenesulfonates.

Pentasubstituted guanidine salts are especially useful when the stocks are compounded on a rubber mill since the salts are generally solid and can be well milled into the uncured elastomer stocks. Fre substituted guanidines and amidines, which are frequently liquid, are more suitable for use in compounding equipment with internal mixing, for example in a Banbury mixer. When free substituted guanidines or amidines are used in a rubber mill, they are conveniently introduced into the mixture in the form of blends with finely powdered solid materials, for example calcium carbonate or silicate. Such blends can be readily prepared in several concentration ranges. It has been found practical to prepare blends which contain about two parts of a pentasubstituted guanidine or N,N,N′ - trisubstituted amidine to one part of solid substrate. Such a blend contains 66⅔% of the active ingredient absorbed or adsorbed on the powdered material.

Pentasubstituted guanidines and N,N,N′ - trisubstituted amidines are considerably better fluoroelastomer vulcanization accelerators for polyhydroxylic aromatic vulcanizing agents than tetramethylguanidine

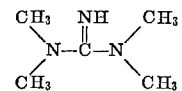

which has been evaluated in the past as accelerator for aliphatic dithiol cures (N. Luyendijk, Technical Report to Aeronautical Systems Division, U.S. Air Force Contract AF-61(052)–582 TR, June, 1963). The preferred vulcanization accelerator of this invention is 2-dodecyl-1,1,3,3-tetramethyl guanidine

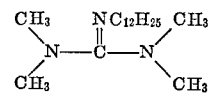

which can be used either free or as a salt.

The elastomer stocks are compounded in a conventional rubber compounding equipment such as a rubber mill or a Banbury mixer. The elastomeric copolymer is blended with a metal compound composed of a divalent metal oxide, such as magnesium oxide, zinc oxide, calcium oxide, or lead oxide, or a divalent metal hydroxide; or a mixture of the oxide and hydroxide; or a mixture of the oxide and/or hydroxide with a metal salt of a weak acid, for example a mixture containing about 1–70% by weight of the metal salt. Among the useful metal salts of weak acids are barium-, sodium-, potassium-, lead-, and calciuum-/-stearate, -benzoate, -carbonate, -oxalate and -phosphite. Known fillers, pigments and other additives can also be present in the composition. The amount of the metal compound added generally is about 1–15 parts by weight per 100 parts of fluoroelastomer, about 2–6 parts being preferred. The metal compound concentration to some extent affects the rate of cure, and below the preferred range the cure rate may sometimes be unduly decreased. Above the preferred range, the elastic properties of a cured fluoroelastomer are gradually impaired and it is, therefore, advantageous not to use too large amounts of the metal compound.

The metal compound serves a dual purpose. It absorbs certain gaseous and acidic materials which are evolved during vulcanization and can chemically attack and weaken the fluoroelastomer. It also provides a long term aging stability. When using a metal oxide, it can be compounded with a fluoroelastomer stock either free or as a metal oxide complex or chelate with organic complexing agents and ligands, such as cyclic polyethers, amines, phosphines, ketones, alcohols, phenols, or carboxylic acids.

The vulcanizing agent, for example bisphenol or hydroquinone, is added in an amount of about 0.1 to 5.0 parts per 100 parts of the elastomer. The preferred amount is approximately 0.6 to 2 parts per 100 parts of the elastomer. Within this preferred range good quality cured elastomers are obtained in the most efficient and economical manner.

The concentration of the vulcanization accelerator is from about 0.1 to about 2.0 parts per 100 parts of the elastomer, calculated in terms of the active ingredient. Thus, when guanidine or amidine adsorbates on an inert solid material are used, the concentration of the guanidine or amidine, and not that of the adsorbate is of interest. Similarly, pentasubstituted guanidine salts are calculated in terms of the free guanidine. It has been found for the preferred catalyst of this invention, 2 - dodecyl-1,1,3,3-tetramethylguanidine, that the optimum concentration is about 0.6 part per 100 parts of the elastomer, which corresponds to 0.9 part per 100 parts of the elastomer of guanidine/solid substrate adsorbate in which the guanidine is present in a 2:1 ratio.

Fluoroelastomer compositions containing the required metal compound, crosslinking agent and vulcanization accelerator are cured by heating for a short period of time to a sufficient temperature, and often are postcured by heating several hours at a higher temperature. The curing temperature is usually maintained within the range of about 149–204° C., and the time of cure can vary from as little as 3 minutes to 30 minutes and above. Postcure requires temperatures of about 204–260° C. Several hours at such high temperatures are generally required for postcuring a fluoroelastomer, the practical time range being 1–48 hours. The cure and postcure temperatures and times are not critical, and lower or higher temperatures and longer or shorter times can be used depending on the particular elastomer formulation and the contemplated application of the vulcanization material. The art is well aware of these factors and how to use them. Fluoroelastomers are cured in conventional equipment, such as a press, a mold, or a vulcanization chamber of an extrusion apparatus. For postcuring, a well-ventilated oven is used.

The purpose of postcuring is to stabilize the final dimensions of a fabricated fluoroelastomer part. It is known that fluoroelastomers which are exposed to high working temperatures gradually give off acidic materials and lose some weight. This deterioration is the sharpest at the beginning and it could cause problems, especially in confined areas, resulting in loss of shape of fluoroelastomer part and possible corrosion of equipment in which it is used. After the postcuring treatment, deterioration of fabricated fluoroelastomer parts is considerably reduced. Most prior art processes require postcuring whatever the intended application of the fluoroelastomer, because a low compression set cannot be obtained otherwise.

It is significant that the fluoroelastomer curing process of the present invention gives good vulcanizates of low compression set which can be used in many applications even without postcuring. A fluoroelastomer used as a hose-liner, for example, which is not expected to be exposed to high temperatures, can be fully cured with a polyhydroxylic aromatic compound in the presence of a pentasubstituted guanidine or an N,N,N'-trisubstituted amidine. No postcuring will be required in such a case.

The following examples illustrate the invention, where all parts, percentages, and proportions are by weight unless otherwise indicated. All Mooney viscosity values are ML–10 values at 100° C. unless otherwise indicated.

GENERAL COMPOUNDING AND TESTING PROCEDURE

The ingredients are blended on a cool two-roll rubber mill until they are thoroughly blended. Samples of a stock are removed for testing in a Mooney viscometer or oscillating disc rheometer (ODR). Other test samples are molded and cured in a press at about 163° C.–168° C. for ten minutes or at about 188° C. for five minutes and then in an air oven at about 232° C. for 24 hours. Mooney scorch test is run according to ASTM D–1646–63. Stress/strain properties are measured at room temperature according to ASTM D–412–66. Compression set is determined according to ASTM D–395–61, Method B. The rate of cure of fluoroelastomer stocks is determined by means of an oscillating disc rheometer (ODR), which measures the relative viscosity of an elastomer by oscillating a grooved biconical disc through an arc while pressed tightly between two test pieces. The amount of torque required to oscillate a disc is reported as a measure of viscosity. Onset of curing is indicated by the rise in viscosity. Curing curves are obtained in which the viscosities (torque values) are plotted against time in minutes. A measure of the rate of cure is given by the slope of the curve at its steepest point.

Hardness is determined by ASTM D–676.

Example 1

A vinylidene fluoride/hexafluoropropylene 60:40 copolymer of Mooney viscosity 63 is compounded with magnesium oxide, carbon black, hydroquinone and a vulcanization accelerator; cured for 5 minutes at about 188° C. in a press; and postcured at about 232° C. for 24 hours. The processing safety of the compositions, illustrated by the Mooney scorch test; the cure rate, illustrated by the ODR test; and the stress/strain properties of the polymers are compared. This example shows that 2-dodecyl-1,1,3,3-tetramethylguanidine is a much better vulcanization accelerator than tetramethylguanidine, in that 2-dodecyl-1,1,3,3-tetramethylguanidine gives a considerably better processing safety, a faster cure rate, and better stress/strain properties.

TABLE I

| Elastomer stock composition, parts: | | |
|---|---|---|
| Fluoroelastomer | 100 | 100 |
| Magnesia (Maglite® Y) | 15 | 15 |
| MT black | 20 | 20 |
| Hydroquinone | 0.8 | 0.8 |
| Tetramethylguanidine on calcium silicate (66⅔% active) | 0.9 | |
| 2-dodecyl-1, 1,3,3-tetramethylguanidine on calcium silicate (66⅔ active) | | 0.9 |
| Mooney scorch test at about 121° C.: | | |
| Minimum | 56 | 24 |
| Minutes to 10-point rise | 5 | 29 |
| ODR test at about 188° C., torque, in.-lbs. after— | | |
| 2½ minutes | 10 | 4 |
| 5 minutes | 40 | 62 |
| 10 minutes | 70 | 119 |
| 15 minutes | 77 | 121 |
| 20 minutes | 80 | 121 |
| Stress/strain properties and hardness: | | |
| 100% modulus, p.s.i. | 1,195 | 1,375 |
| Tensile strength, p.s.i. | 1,440 | 2,095 |
| Elongation at break, percent | 110 | 130 |
| Hardness | 75 | 85 |

Example 2

In this example, the curing efficiencies of 2-dodecyl-1,1,3,3 - tetramethylguanidine and of 1,5-diazabicyclo-[4.3.0]-nonene-5 (a bicyclic amidine) are compared. The fluoroelastomer is a vinylidene fluoride/hexafluoropropylene 60:40 copolymer which has a Mooney viscosity of 35. The elastomer is cured in a press for 10 minutes at about 163° C. elastomer is cured in a press for 10 minutes at about 163° C. and postcured in an oven for 24 hours at about 232° C.

The results of the Mooney Scorch Test at 121° C., of ODR test at 163° C., the stress/strain properties, and the compression set are presented in Table II below. It can be seen from these data that 2-dodecyl-1,1,3,3-tetramethylguanidine has a slightly better processing safety, faster cure rate and lower compression set than 1,5-diazabicyclo-[4.3.0]-nonene-5, while stress/strain properties of the fluoroelastomer cured with either vulcanization accelerator are about equal.

TABLE II

| Elastomer stock composition, parts: | | |
|---|---|---|
| Fluoroelastomer | 100 | 100 |
| Magnesia (Maglite D) | 10 | 10 |
| MT black | 20 | 20 |
| Hydroquinone | 1 | 1 |
| 2-dodecyl-1,1,3,3-tetramethylguanidine | 0.6 | ----- |
| 1,5-diazabicyclo[4.3.0]-nonene-5 | ----- | 0.6 |

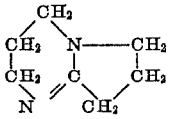

| | | |
|---|---|---|
| Mooney scorch test at about 121° C.: | | |
| Minimum | 29 | 33 |
| Mnutes to 10-point rise | 12.5 | 7 |
| ODR test at about 163° C., torque, in.-lbs. after— | | |
| 1 minute | 4 | 6 |
| 5 minutes | 10 | 10 |
| 10 minutes | 76 | 35 |
| 15 minutes | 94 | 43 |
| 20 minutes | 100 | 47 |
| Stress/strain properties and hardness: | | |
| 100% modulus, p.s.i | 1,195 | 1,060 |
| Tensile strength, p.s.i | 1,755 | 1,845 |
| Elongation at break, percent | 130 | 140 |
| Hardness, A | 71 | 74 |
| Compression Set—B—(1″ x 0.139″ O-rings): | | |
| 70 hrs./about 24° C | 6 | 9 |
| 70 hrs./about 204° C | 29 | 41 |

Example 3

Here, the performance of 2-dodecyl-1,1,3,3-tetramethylguanidine in five different elastomer stocks is compared. The following designations are used in the Table III, below:

Fluoroelastomer 1 is a vinylidene fluoride/hexafluoropropylene 60:40 copolymer of Mooney viscosity 63.

Fluoroelastomer 2 is a vinylidene fluoride/hexafluoropropylene 60:40 copolymer of Mooney viscosity 35.

Fluoroelastomer 3 is a vinylidene fluoride/hexafluoropropylene/tetrafluoroethylene 45:30:25 terpolymer of Mooney viscosity 118.

Fluoroelastomer 4 is a vinylidene fluoride/hexafluoropropylene/tetrafluoroethylene 45:30:25 terpolymer of Mooney viscosity 50.

Fluoroelastomer 5 is a vinylidene fluoride/hexafluoropropylene 60:40 copolymer of Mooney viscosity (ML–10 at 121° C.) of 170.

All polymers are cured for 10 minutes at about 168° C. and postcured in a oven for 24 hours at about 232° C. The comparative data, presented in Table III, show that good processing safeties are obtained in all cases; that elastomer stocks cure at satisfactory rates; and that cured elastomers have good stress/strain properties and a low compression set.

TABLE III

| Fluoroelastomer stock comparison, parts: | | | | | |
|---|---|---|---|---|---|
| Fluoroelastomer 1 | 100 | | | | |
| Fluoroelastomer 2 | | 100 | | | |
| Fluoroelastomer 3 | | | 100 | | |
| Fluoroelastomer 4 | | | | 100 | |
| Fluoroelastomer 5 | | | | | 100 |
| Magnesia (Maglite D) | 4 | 4 | 4 | 4 | 4 |
| MT black | 20 | 20 | 20 | 20 | 20 |
| Hydroquinone | 0.8 | 0.8 | 0.8 | 0.8 | 0.8 |
| 2-dodecyl-1,1,3,3-tetramethylguanidine on calcium silicate (66⅔% active) | 0.9 | 0.9 | 0.9 | 0.9 | 0.6 |
| Mooney scorch test at about 121° C.: | | | | | |
| Minimum | 24 | 18 | 21 | 42 | 83 |
| Minutes to 10-point rise | 28 | 19 | 29 | 33 | 10 |
| ODR test at 168°C., torque, in.-lbs. after— | | | | | |
| 2½ minutes | 3 | 8 | 2 | 5 | 24 |
| 5 minutes | 33 | 76 | 47 | 35 | 88 |
| 10 minutes | 71 | 86 | 78 | 81 | 102 |
| 15 minutes | 75 | 89 | 80 | 85 | 104 |
| 20 minutes | 77 | 90 | 80 | 85 | 104 |
| Stress/strain properties and hardness: | | | | | |
| 100% modulus, p.s.i | 675 | 720 | 655 | 610 | 1,060 |
| Tensile strength, p.s.i | 1,710 | 1,800 | 1,780 | 2,070 | 1,935 |
| Elongation, percent | 170 | 170 | 170 | 190 | 150 |
| Hardness, A | 67 | 70 | 66 | 66 | 65 |
| Compression Set—B (1″ x 0.139″ O-rings): | | | | | |
| 70 hrs./about 24° C | 6 | 6 | 7 | 7 | 3 |
| 70 hrs./about 204° C | 32 | 33 | 38 | 40 | 23 |

A sample of Fluoroelastomer 5, which had been only press-cured for 10 minutes at 168° C., but not postcured, was subjected to a compression set test with the following results: 70 hours/about 204° C., 25. This experiment shows that a fluoroelastomer merely cured with hydroquinone in the presence of 2-dodecyl-1,1,3,3-tetramethylguanidine has a low compression set, practically identical with that of a postcured sample.

Example 4

In this example, cures of fluoroelastomer with hydroquinone and with two different bisphenols are compared. The fluoroelastomer is a vinylidene fluoride/hexafluoropropylene 60:40 copolymer of Mooney viscosity 63. The elastomer is press-cured for 10 minutes at 163° C. and postcured in an oven for 24 hours at about 232° C.

Bisphenol A is a bisphenol of the general Formula III, where the bifunctional radical A is isopropylidene.

Bisphenol AF is a bisphenol of the general Formula III, where the bifunctional radical A is hexafluoroisopropylidene. The data, tabulated below, show that both bisphenols have a much greater processing safety than hydroquinone, yet give comparable cure rates and give cured fluoroelastomers of comparable stress/strain properties and compression set.

TABLE IV

| Fluoroelastomer stock composition, parts: | | | |
|---|---|---|---|
| Fluoroelastomer | 100 | 100 | 100 |
| Magnesia (Maglite D) | 10 | 10 | 10 |
| MT black | 20 | 20 | 20 |
| 2-dodecyl-1,1,3,3-tetramethylguanidine | 0.75 | 0.75 | 0.75 |
| Hydroquinone | 1 | | |
| Bisphenol AF | | 2 | |
| Bisphenol A | | | 2 |
| Mooney scorch test at about 121° C.: | | | |
| Minimum | 43 | 35 | 35 |
| Minutes to 10-point rise | 10 | (¹) | (¹) |
| ODR test at about 163° C., torque, in.-lbs. after— | | | |
| 2½ minutes | 7 | 6 | 7 |
| 5 minutes | 15 | 5 | 5 |
| 10 minutes | 75 | 30 | 16 |
| 15 minutes | 116 | 91 | 87 |
| 20 minutes | 115 | 117 | 125 |
| Stress/strain properties and hardness: | | | |
| 100% modulus, p.s.i | 1,170 | 1,080 | 1,440 |
| Tensile strength, p.s.i | 1,620 | 1,870 | 1,845 |
| Elongation at break, percent | 120 | 140 | 110 |
| Hardness, Durometer A | 72 | 74 | 71 |
| Compression set—B—(1″ x 0.139″ O-rings): | | | |
| 70 hrs./about 24° C | 6 | 6 | 4 |
| 70 hrs./about 204° C | 29 | 35 | 37 |

¹ 2 points/30 minutes.

Example 5

Two additional useful fluoroelastomer compositions are prepared according to the present invention. As shown in Table V, the first formula uses calcium hydroxide alone as the metal compound; and the second formula uses a mixture of calcium hydroxide and magnesium oxide. The accelerator is 2-dodecyl-1,1,3,3-tetramethylguanidine absorbed on silica, the weight ratio of the guanidine compound to silica being about 25:75. The fluoroelastomer is the same as in Example 4. The composition is press-cured for 10 minutes at 169° C. and postcured in an oven for 24 hours at about 232° C.

Articles made from the first formula are especially useful in applications requiring superior resistance to acids or steam.

TABLE V

| Fluoroelastomer stock composition, parts: | | |
|---|---|---|
| Fluoroelastomer | 100 | 100 |
| Magnesia (Maglite D) | | 3 |
| Calcium hydroxide | 6 | 6 |
| MT black | 30 | 30 |
| Accelerator | 1 | 1 |
| Hydroquinone | 0.8 | 0.8 |
| Mooney scorch test at about 121° C.: | | |
| Minimum | 24 | 30 |
| Minutes to 10-point rise | 30 | 32 |
| ODR test at about 169° C. after— | | |
| 2½ minutes | 3 | 3 |
| 5 minutes | 6 | 10 |
| 10 minutes | 47 | 80 |
| 15 minutes | 71 | 95 |
| 20 minutes | 75 | 99 |
| Stress/strain properties and hardness: | | |
| 100% modulus, p.s.i. | 700 | 875 |
| Tensile strength, p.s.i. | 2,150 | 1,975 |
| Elongation at break, percent | 220 | 170 |
| Hardness, Durometer A | 77 | 73 |
| Compression set—B—(1″ x 0.139″ O-rings): | | |
| 70 hrs./about 24° C | 6 | 6 |
| 70 hrs./about 204° C | 26 | 24 |

Examples 6 and 7

These two examples illustrate the use of Bisphenol S (4,4'-dihydroxy diphenyl sulfone) as the cross-linking agent. This is a bisphenol of the general Formula III shown above wherein radical A is a sulfonyl radical. The two fluoroelastomer compositions and the test results therein are shown in Table VI. The compositions differ only in the amount of accelerator present. The fluoroelastomer is the same kind as used in Example 5; this applies also to the magnesia, carbon black, and accelerator. As in the previous examples, the ingredients are blended on a cool two-roll rubber mill, and tests are conducted on samples of the resulting compositions.

In Example 6, the oscillating disc rheometer (ODR) test is done at 193° C., and in Example 7 at 177° C.

In Example 6, the samples for the stress/strain and compression set tests are press cured for 30 minutes at 193° C. and post-cured in an oven for 24 hours at 260° C. The Example 7 samples are made in the same manner except the press cure time is 15 minutes. O-rings (1″ x 0.139″) are used for the compression set test.

TABLE VI

| | Ex. 6 | Ex. 7 |
|---|---|---|
| Fluoroelastomer composition, parts: | | |
| Fluoroelastomer | 100 | 100 |
| Magnesia | 3 | 3 |
| Calcium hydroxide | 6 | 6 |
| Carbon black | 30 | 30 |
| Accelerator | 1 | 1.5 |
| Bisphenol S | 2 | 2 |
| ODR test after— | | |
| 10 minutes | 3.0 | 8.2 |
| 15 minutes | 5.5 | 17.6 |
| 30 minutes | 53.3 | 89.5 |
| 40 minutes | 76.6 | 93.9 |
| 60 minutes | 83.4 | 95.8 |
| Stress/strain properties: | | |
| 100% modulus, p.s.i. | 850 | 1,250 |
| Tensile strength, p.s.i. | 2,100 | 2,000 |
| Elongation at break, percent | 190 | 150 |
| Compression set: | | |
| 70 hrs. at 204° C | 26 | 24 |
| 70 hrs. at 232° C | 47 | 55 |
| 330 hrs. at 204° C | 58 | 66 |

I claim:
1. A curable fluoroelastomer composition comprising
   (1) an elastomeric copolymer of vinylidene fluoride and at least one other fluorinated monomer,
   (2) a substance selected from the group consisting of divalent metal oxides, divalent metal hydroxides, and mixtures of such oxides or hydroxides with metal salts of weak acids,
   (3) a polyhydroxylic aromatic compound cross-linking agent for the copolymer selected from the group;

di-, tri-, and tetrahydroxybenzenes, naphthalenes, and anthracenes, and bisphenols of the formula

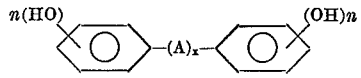

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine, or a carboxyl or acyl radical, and
(4) a vulcanization accelerator selected from the group:
   (a) a guanidine of the formula

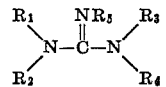

where each of $R_1$, $R_2$, $R_3$, $R_4$, and $R_5$ can independently be an alkyl, cycloalkyl, aralkyl, or aryl radical of 1–20 carbon atoms, with a proviso that no more than two aromatic radicals can be present; and with a further proviso that any two radicals can be joined to form a ring structure;
   (b) a salt of a guanidine described in paragraph (a) with an organic or inorganic acid; and
   (c) an amidine of the formula

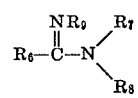

where each of $R_6$, $R_7$, $R_8$, and $R_9$ can independently be an alkyl, cycloalkyl, or aralkyl radical of 1–20 carbon atoms; and any two radicals can be joined to form a ring structure.

2. A composition of claim 1 wherein component (2) is present in the proportion of 1 to 15 parts; component (3) is present in the proportion of 0.1 to 5.0 parts; and the vulcanization accelerator is present in the proportion of 0.1 to 2.0 parts; all based on 100 parts by weight of the copolymer.

3. A composition of claim 2 where the elastomeric copolymer of vinylidene fluoride is selected from the group: dipolymer with hexafluoropropylene, dipolymer with chlorotrifluoroethylene, and terpolymer with hexafluoropropylene and tetrafluoroethylene.

4. A composition of claim 2 where the vulcanization accelerator is 2-dodecyl-1,1,3,3-tetramethylguanidine, of the formula

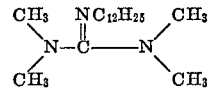

5. A composition of claim 4 where component (3) is hydroquinone.

6. A composition of claim 4 where component (3) is isopropylidenebis(4-hydroxybenzene).

7. A composition of claim 4 where component (3) is 4,4'-dihydroxy diphenyl sulfone.

8. A composition of claim 4 where component (3) is hexafluoroisopropylidene-bis(4-hydroxybenzene).

9. A fluoroelastomer copolymer curing process which comprises (A) providing a mixture of the following components:
   (1) an elastomeric copolymer of vinylidene fluoride and at least one other fluorinated monomer,
   (2) a substance selected from the group consisting of divalent metal oxides, divalent metal hydroxides, and mixtures of such oxides or hydroxides with metal salts of weak acids, (3) a polyhydroxylic aromatic compound cross-linking agent for the copolymer selected from the group: di-, tri-, and tetrahydroxybenzenes, naphthalenes, and anthracenes, and bisphenols of the formula

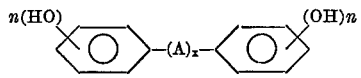

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; $x$ is 0 or 1; $n$ is 1 or 2; and any aromatic ring of the polyhydroxylic compound is optionally substituted with at least one atom of chlorine, fluorine, or bromine, or a carboxyl or acyl radical, and (4) a vulcanization acceleration selected from the group:

(a) a guanidine of the formula

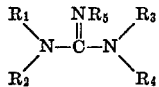

where each of $R_1$, $R_2$, $R_3$, $R_4$, and $R_5$ can independently be an alkyl, cycloalkyl, aralkyl, or aryl radical of 1–20 carbon atoms, with a proviso that no more than two aromatic radicals can be present; and with a further proviso that any two radicals can be joined to form a ring structure;

(b) a salt of a guanidine described in paragraph (a) with an organic or inorganic acid; and (c) an amidine of the formula

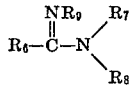

where each of $R_6$, $R_7$, $R_8$, and $R_9$ can independently be an alkyl, cycloalkyl, or aralkyl radical of 1–20 carbon atoms; and any two radicals can be joined to form a ring structure; and (B) heating the resulting mixture until the fluoroelastomer is cured.

10. A cured composition made according to the process of claim 9.

11. The process of claim 9 where the proportion of component (2) is 1 to 15 parts; the proportion of component (3) is 0.1 to 5.0 parts; and the proportion of component (4) is 0.1 to 2.0 parts; all based on 100 parts by weight of component (1).

12. The process of claim 9 where component (1) is selected from the group: dipolymer with hexafluoropropylene, dipolymer with chlorotrifluorethylene, and terpolymer with hexafluoropropylene and tetrafluoroethylene.

13. A composition made by the process of claim 12.

14. The process of claim 12 where the vulcanization accelerator is 2-dodecyl-1,1,3,3-tetramethylguanidine of the formula

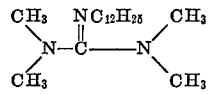

15. The process of claim 12 where the mixture is heated in step (B) for about 3–30 minutes at about 149–204° C.

16. The process of claim 15 where the mixture is heated in step (B) for about an additional 1–48 hours at about 204–260° C.

References Cited

UNITED STATES PATENTS 3,041,316   6/1962   Griffin _____ 260—79

JOSEPH L. SCHOFER, Primary Examiner

S. M. LEVIN, Assistant Examiner

U.S. Cl. X.R.

260—23.5 R, 41 C, 80.77, 87.7